INVENTOR
A. ZAROUNI
BY
Harold C. Herman
ATTORNEY

Dec. 26, 1961 A. ZAROUNI 3,014,652

AUTOMATIC DATA READER

Filed Nov. 8, 1957 3 Sheets-Sheet 2

INVENTOR
A. ZAROUNI
BY Harold C. Herman
ATTORNEY

Dec. 26, 1961 A. ZAROUNI 3,014,652

AUTOMATIC DATA READER

Filed Nov. 8, 1957 3 Sheets-Sheet 3

INVENTOR
A. ZAROUNI
BY Harold C. Herman
ATTORNEY

United States Patent Office 3,014,652

Patented Dec. 26, 1961

3,014,652
AUTOMATIC DATA READER

Alfred Zarouni, Brooklyn, N.Y., assignor to Bell Telephone Laboratories, Incorporated, New York, N.Y., a corporation of New York Filed Nov. 8, 1957, Ser. No. 695,308
16 Claims. (Cl. 235—61.6)

This invention relates to data processing equipment and more particularly to data processing equipment which analyzes magnetically recorded data.

In automatic telephone switching systems it is desirable to determine the traffic conditions of the various lines, trunks and circuits in the system in order to provide optimum service consistent with economy of operation. The traffic information is utilized to determine how many trunks and circuits are needed to handle a given volume of traffic without decreasing the quality of the telephone service. The traffic conditions of the lines, trunks and circuits may be determined by periodically sampling their electrical conditions. Equipment for periodically sampling and recording traffic conditions is disclosed in the patent application, Serial No. 619,424, filed on October 31, 1956, by J. K. Middaugh. The traffic sampling and recording equipment periodically records on a magnetic tape groups of signals which represent the traffic conditions of groups of lines, trunks, and circuits. In order to utilize the recorded information, it must be decoded and analyzed with the information relating to specific lines, trunks and circuits sorted and accumulated.

It is a general object of the invention to provide a data reader which automatically decodes and accumulates magnetically recorded coded signals.

Another object of this invention is to analyze groups of coded signals by sorting them first on a coded basis and then on a time basis during a single reading of the groups of coded signals.

Still another object of this invention is to provide a data reader which continuously checks the accuracy of its operation.

In an illustrative embodiment of this invention, the coded signals represent traffic information relating to groups of subscriber lines. The signals are recorded on two tracks of a magnetic tape with one track being utilized to identify both the groups of lines and the individual lines in each group and the other track being utilized for the traffic data. On the identifying track the groups are identified on a code basis and the lines in each group are identified on a time basis. On the data track a signal is recorded for each line busy indication with the indication being recorded in the data track adjacent the identifying signal for the busy line on the identifying track.

During one sampling interval, the traffic information is recorded for each line in each group. The information on the tape that is analyzed represents many sampling intervals, each of which includes the traffic information of all the groups of lines.

A feature of this invention relates to the provision of means for analyzing the traffic information of the lines in a preselected one of the groups of lines.

The data reader includes a reading arrangement for each of the two tracks on the tape. The signals from the identifying track are supplied by one of the reading arrangements to a decoding circuit which includes a group preselector switch. The preselector switch determines the identity of the group of lines which is to be analyzed by the reader. When the preselected group is identified, the decoding circuit establishes a connection for supplying the line identifying signals in the preselected group to a counter circuit. The counter circuit keeps track of the number of scans or groups of signals that are analyzed and it also drives a diode matrix. When the decoded circuit identifies the coded signals identifying the preselected group, the traffic data recorded on the second track of the tape is also supplied to the matrix. The matrix sorts the traffic data and supplies the sorted data to a bank of registers which are associated individually with the time position of the lines in the group. As scan after scan is read, the register accumulates the traffic data for each line in the preselected group.

Another feature of this invention relates to the means for accumulating the traffic data in each line in the preselected group during a single reading of the tape. Only a single reading is required because one register is provided for each time position.

Still another feature of this invention relates to the provision of means for checking the accuracy of the reader as each scan interval is analyzed.

Another feature of this invention pertains to the provision of means for counting the scan intervals analyzed by the reader.

Still another feature of this invention pertains to the provision of means for halting the operation of the reader in the absence of a busy indication for a predetermined interval.

Further objects, features and advantages will become apparent upon consideration of the following description taken in conjunction with the drawing wherein:

FIGS. 1–3, when arranged in accordance with FIG. 4, are a circuit representation of the data reader of this invention;

Figure 1:
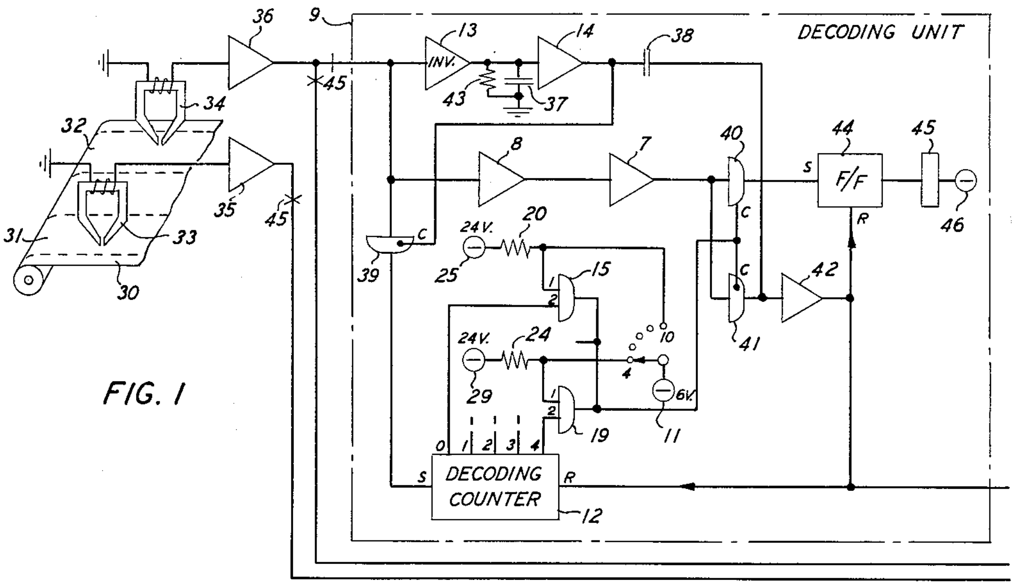
Figure 4:
FIG. 4 illustrates the arrangement of FIGS. 1–3.
Figure 2:
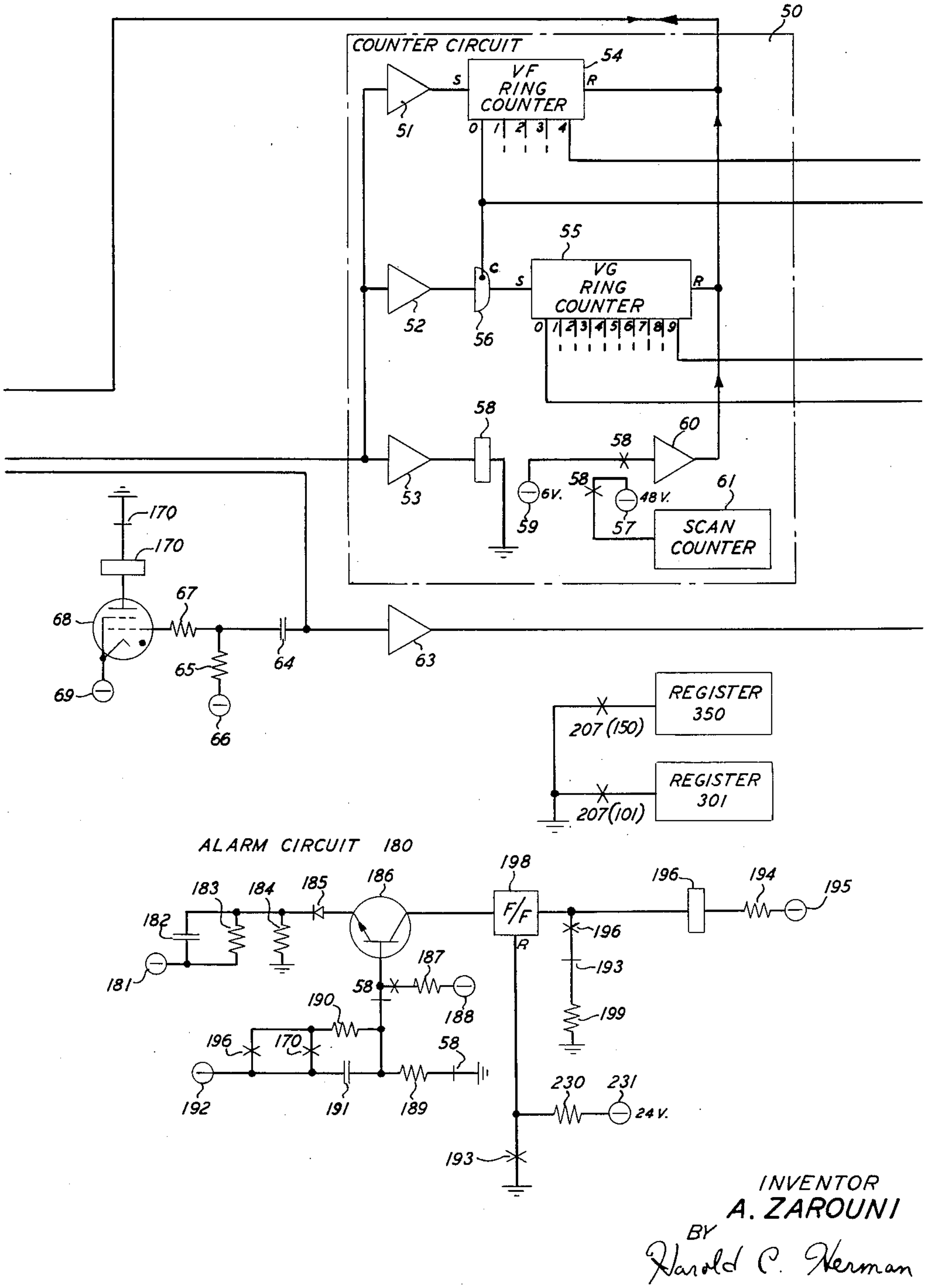
Figure 3:
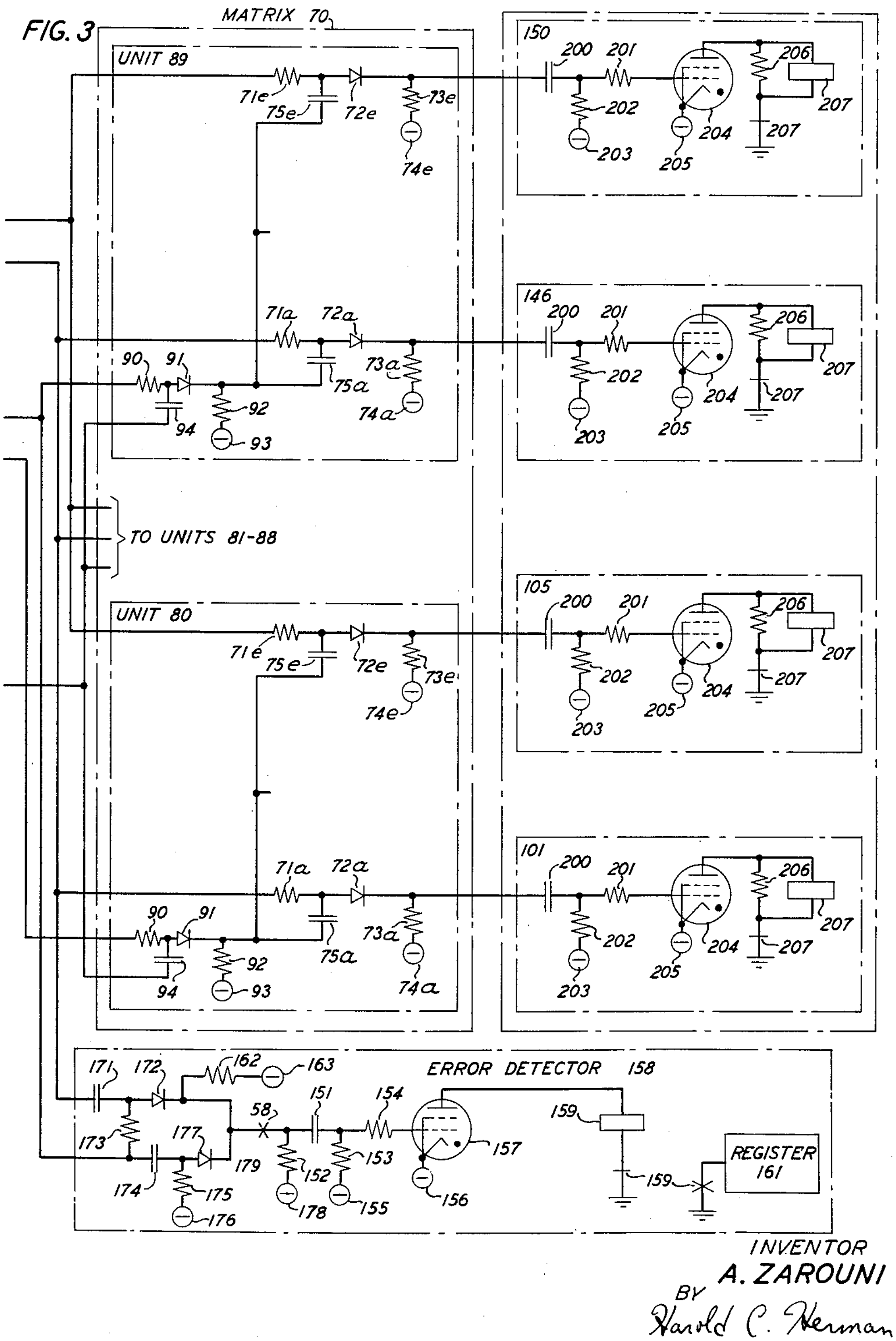

Referring to FIGS. 1–3 arranged in accordance with FIG. 4, the input to the data reader is a two-track magnetic tape 30. Tracks 31 and 32 of the magnetic tape 30 pass respectively adjacent the reading heads 33 and 34. A dual track head may be utilized instead of the heads 33 and 34. The information recorded on track 32 identifies five line groups HG0–4, not shown, each consisting of fifty lines LO1–50, also not shown. As indicated in the illustrative tape recording shown in FIG. 5, the groups HG0–4 are identified on a decimal code basis and the lines LO1–50 in each of the groups are identified on a time division basis. For example, a single mark on track 32 identifies the group HG0, two consecutive marks identify group HG1, and fifty consecutive marks follow each of the group codes, one mark for each of the lines LO1–50 in the group. The first line identifying mark indicates line LO1, the second indicating line indicates line LO2, etc.

Track 31 includes the line busy data with a signal or mark being recorded to indicate a busy condition and no signal being recorded to indicate an idle condition. The line busy signals are recorded in track 31 adjacent the line identifying mark for the busy line on track 32. In other words, to indicate a busy condition, a mark appears both in track 32 to identify the line and in track 31 to indicate the busy condition. The two marks are read simultaneously by the heads 33 and 34.

In the illustrative embodiment, the data reader may be set to analyze the traffic conditions of any of the five groups HG0—4. The data reader includes a decoding circuit 9 having a preselector switch 10. The switch 10 may be set to connect a 6-volt negative battery 11 to any one of its five terminals 0–14. With the switch 10 set, for example, at its terminal 4, the data reader ignores the traffic data for groups HG0–3 and analyzes the data for group HG4.

The identifying signals on track 32 change the magnetic flux condition in the head 34 causing it to supply pulses from its grounded winding through the reading amplifier 36 and a normal contact of relay 45 to the decoding circuit 9. In FIGS. 1–3 the relay contacts are shown detached or not necessarily adjacent to the relay winding as they are shown as part of the paths which they complete. If the path in which the contact appears is completed when the relay is normal, the contact is shown as a dash line perpendicular to the path, and if the path is completed when the relay is operated, the contact is shown as an X intersecting the path. For example, the amplifier 36 is connected both to a normal contact and to an operated contact of a relay 45. The contacts are given the same designation as the relay. When the relay 45 is normal, a pulse from the amplifier 36 passes through the normal contact to the decoding circuit 9, and when relay 45 is operated, the path from the amplifier 36 to the circuit 9 is opened or broken and a path is completed from the amplifier 36 through the closed or operated contact of relay 45 to an amplifier 53 in a counter circuit 50.

The signals presented to the amplifiers 35 and 36 are bipolar waves that are approximate differentiated square pulses with slightly sloped leading and trailing edges. The peak to peak signal amplitude to the amplifiers 35 and 36 may be approximately 0.5 millivolt.

With relay 45 normal, the first group coding pulse identifying group HG0 is supplied to a timing amplifier 8, to an inverter 13, and also through an inhibiting gate 39 to a decoding counter 12. The inhibiting gate 39, the decoding counter 12, as well as a number of other gates, flip-flops, circuits and amplifiers, hereinafter described, are well known in the art and described for example in the A. E. Joel, Jr. et al. Patent 2,812,385 issued on November 5, 1957. The gate 39 is a three-terminal gate which normally allows the passage of positive pulses. When, however, a positive pulse is applied at its control terminal C, the passage of positive pulses through the gate 39 is inhibited. Since the control terminal C of the gate 39 is connected to the output of a delay amplifier 14, the positive group pulse identifying group HG0 passes to the input or set terminal S of the ring counter 12.

A ring counter is a walking or stepping circuit having a number of bistable stages connected in a chain with the last stage connected to the first stage. When a stage is enabled by an input pulse at terminal S, it resets its previous stage and it enables its succeeding stage. The counter 12 has five stages and all five stages are in a reset condition before the group pulse is received at terminal S.

The group pulse from the head 34 sets the decoding counter 12 to provide a positive output potential at its "0" terminal, the output terminal of the first counter stage. The output terminals 0–4 of the decoding counter 12 are connected respectively to the input terminals 2 of the AND gates 15—19. Each of the AND gates 15—19 has two terminals 1 and 2, and a positive output is provided when both terminals 1 and 2 are energized or relatively positive. The terminals 1 of the AND gates 15—19 are connected respectively through the resistors 20—24 to the negative potential sources 25—29. With the switch 10 set at terminal 4, the sources 25—28 function to inhibit or disable the AND gates 15—18 so that the potential from the output terminal 0 of the counter 12 is blocked. Terminal 1 of the gate 19 is at a relatively positive or energizing potential due to its connection through terminal 4 of the switch 10 to the source 11. As is hereinafter described, when the counter 12 provides an output potential at its terminal 4, the AND gate 19 is energized to provide a positive output to the control terminals C of gates 40 and 41.

As described above, the first group pulse identifying the group HG0 is also provided to an inverter 13. The inverter 13 provides a negative charging pulse to a capacitor 37 which controls the operation of an amplifier 14. The amplifier 14 operates when the capacitor 37 is negatively charged at a predetermined potential level. The single pulse from the inverter 13 responsive to the group pulse is insufficient to trigger the amplifier 14. At least six pulses in succession are required from the inverter 13 to charge the capacitor 37 sufficiently to operate the amplifier 14. The capacitor 37 discharges somewhat after each pulse through the grounded resistor 43. As is hereinafter described, once the amplifier 14 is operated, it remains operated as long as pulses are successively supplied from the inverter 13. As indicated above, the first coding pulse is also provided to the timing amplifier 8. The amplifier 8 supplies a positive output pulse having a duration of 10 milliseconds, the negative trailing edge of which operates an inverter amplifier 7. The amplifier 8 is similar to the amplifier 14 in that it continues to provide a positive output as long as input pulses are successively applied thereto. The negative trailing edge occurs 10 milliseconds after the last pulse. The positive output pulse from the inverter amplifier 7 is supplied to the input terminals of the mismatch inhibiting gate 41 and the match enabling gate 40 which, as described above, are controlled by the AND gates 15—19. The enabling gate 40 is a three-terminal device normally inhibiting the passage of pulses. The gates 40 and 41 are controlled by the decoding counter 12 in accordance with the setting of a preselector switch 10 and remain in their normal condition until the signals identifying group HG4 are read.

When an output potential is provided at terminal 4 of the decoding counter 12, a pulse is provided through the AND gate 19 to the control terminals of the gates 40 and 41. The other four AND gates 15—18 remain disabled throughout the operation of the data reader as long as the selector switch remains set at terminal 4. In the absence of a control potential from the gates 15—19, the pulse from the amplifier 7 passes through the mismatch gate 41 to the reset amplifier 42. The amplifier 42 supplies a reset pulse to return the data reader to normal. More specifically, the reset pulse resets all of the set or operated stages in the decoding counter 12. The reset pulse is also provided to the reset terminal of a flip-flop circuit 44, and to a counter circuit 50 which is hereinafter described.

Figure 5:
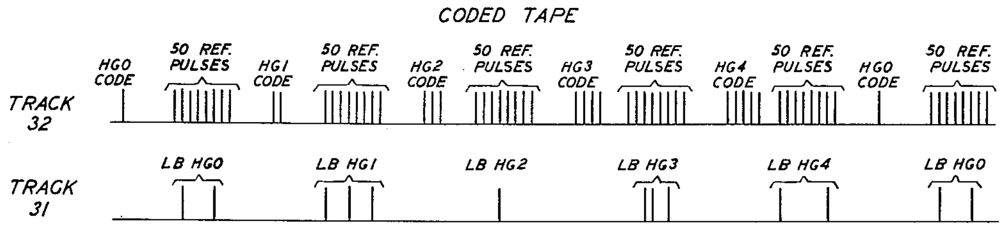
FIG. 5 is a series of curves illustrating the tape recording analyzed by the data reader.

As indicated in FIG. 5, fifty reference signals follow the group coded signals in track 32 of the tape. These identifying signals are read by the head 34 and supplied to the inverter 13, the amplifier 8 and the gate 39. When six of the identifying or timing pulses are provided from the inverter 13, the capacitor 37 becomes sufficiently charged to operate the amplifier 14. The amplifier 14 thereupon provides a control potential to terminal C of the gate 39 and through the coupling capacitor 38 to the reset amplifier 42. The first five timing pulses pass through the gate 39 to the counter 12 causing it to step the output to its terminal 4. When the output is provided at terminal 4, the AND gate 19 is energized to provide a control potential to the control terminals C of the gates 40 and 41. The gate 40 is enabled by the control potential to ready a path from the amplifier 7 to the set terminal S of the flip-flop circuit 44. The circuit 44 is a bistable circuit which is set when a positive pulse is received at its terminal S and reset when a positive pulse is received at its terminal R.

The inverter amplifier 7, however, does not provide a pulse to the gate 40 because it is operated, as described above, at the end of the pulse supplied by the amplifier 8, and the amplifier 8 remains operated as long as the timing pulses are supplied thereto.

When the sixth timing pulse is read, the counter 12 is reset due to the operation of the amplifier 14, also described above, and it remains reset until after all fifty timing pulses are read. The counter 12 remains reset because of the inhibition of the gate 39 by the amplifier 14. After the fiftieth timing pulse is read, the amplifier 14 removes the control potential from the gate 39 and ten milliseconds after the fiftieth pulse, the amplifier 8 operates the inverter 7. With the counter reset, the gates 40 and 41 are normal and the pulse from the inverter 7 is provided as a check reset pulse to the reset terminals of the circuit 44 and the counter 12 and also to the counter circuit 50.

When the single mark identifying the group HG0 is read, the traffic information for the lines LO1–50 in the group HG0 is therefore not utilized. As is hereinafter described, traffic information is analyzed when the flip-flop circuit 44 is set. The sequence of operations continues with the circuit 44 remaining normal or reset until the group signals corresponding to the setting of the preselector switch 10 are read. When the coded signals identifying the coded signal HG4 are read, the decoding counter 12 advances to provide an enabling or control potential at its terminal 4. The AND gate 19, as described above, has one of its terminals enabled due to the setting of the switch 10. With the AND gate 19 fully enabled by this combination of conditions, a control potential is provided to enable the match gate 40 and to disable the mismatch gate 41. The output of the inverting amplifier 7 is now passed through the gate 40 instead of through the gate 41. The pulse through the gate 40 functions to set the flip-flop circuit 44 which operates the relay 45 as the winding of relay 45 is connected between the negative battery 46 and the output terminal of the circuit 44.

With relay 45 operated, the information on tracks 32 and 31 of the tape 30 is supplied respectively to the counter circuit 50 and to a line busy amplifier 63. The circuit 44 remains set until a reset pulse is provided thereto from a reset amplifier 60 in the counter circuit 50. Neither the inverter amplifier 7 nor the inverter amplifier 14 provides another pulse to the amplifier 42 because the operaton of relay 45 opens the path from the amplifier 36 thereto. As hereinafter described, the amplifier 60 does not provide a reset pulse until after the fifty line identifying signals have been read.

In this manner, the decoding circuit 9 functions to recognize the preselected group and to supply the traffic data for the lines in the preselected group to the reset of the reader circuitry. If the circuit 9 fails to recognize the group coded signals, the traffic information is ignored. The line identifying signals are supplied from the amplifier 36 through the operated contact of the relay 45 to three amplifiers 51—53 in the counter circuit 50. The amplifier 53 is connected to the winding of a relay 58 which is also connected to ground. Relay 58, which is normally operated, is released by the operation of the amplifier 53 and it remains released as long as the line identifying pulses are received at the amplifier 53. As is hereinafter described, between scans, relay 58 operates to reset the counter 50 and the decoding unit. When relay 58 releases, it initiates a timing operation in an alarm circuit 180 which is also hereinafter described.

As described above, the line identifying pulses are provided to the amplifiers 51 and 52 at the same time they are provided to the amplifier 53. The amplifiers 51 and 52 are connected respectively to the set terminal S of the vertical file ring counter 54 and to the input terminal of an enabling gate 56. The gate 56 is part of an input path to a vertical group ring counter 55. The counter 54 is a five-stage counter which completes one operating cycle for every step of the counter 55, and the counter 55 is a ten-stage ring counter. In other words, for every five pulses supplied to the counter 54, one pulse is supplied to the counter 55. Thus, the combination of the two counters 54 and 55 counts fifty pulses before beginning the second count.

The counters 54 and 55 are normally set at their first stage and tenth stage, respectively. With the counter 54 set at its first stage, a control potential is provided to the control terminal C of the enabling gate 56. The first pulse therefore from the amplifier 36 passes through the gate 56 to step the counter 55 to its first stage providing an output at its terminal 0. The first timing pulse also steps the output of the counter 54 from its terminal 0 to terminal 1 disabling thereby the gate 56. For each cyclic operation of the counter 54, the counter 55 is, in this manner, stepped once. The amplifier 51 provides for a slight delay of the pulse to the counter 54 to insure the passage of the pulse through the gate 56 to the counter 55.

The output terminals of the counters 54 and 55 are connected to a diode matrix 70 which consists of ten units 80 through 89. Each of the ten units 80 through 89 has five similar diode sections *a*—*e* with the components in each of the sections *a*—*e* having similar numeral designations followed by the letters *a* through *e*. With ten units 80 through 89 and each unit having five sections *a*—*e*, there fifty sections in all in the matrix 70. The counters 54 and 55 function to successively enable these fifty sections. The output terminals 0—9 of the counter 55 are connected respectively to the resistors 90 in the units 80 through 89 and the resistors 90 are connected respectively through diodes 91 to five capacitors 75*a–e*. The diodes 91 are normally back biased by an 18-volt potential as the normal output at one of the terminals of the counter 55 is minus 24 volts and the diodes 91 are connected respectively through resistors 92 to the minus 6-volt batteries 93. With one of the terminals 0—9 of the counter 55 at a potential of minus 8 volts and all the rest are at a potential of minus 24 volts, only one of the diodes 91 in the units 80 through 89 is relatively forward biased. With the potential of an operated counter stage at minus 8 volts, the relatively forward biased diode 91 in the matrix 70 is still effectively back biased by the small potential of 2 volts. This small back biasing is maintained to prevent the false operation of one of the control circuits 101—50 connected to the matrix 70 due to spurious potentials.

Similarly, only one of the terminals 0–4 of the counter 54 is at a potential of minus 8 volts with the rest at a potential of minus 24 volts. The output terminals 0–4 of the counter 54 are connected respectively to the resistors 71*a–e* in each of the units 80 through 89. The resistors 71*a–e* are connected respectively to the diodes 72*a–e* which are normally reverse biased due to their connections respectively to the minus 6-volt batteries 74*a–e* through the resistors 73*a–e*. The combination of one operated stage in the counter 54 and one operated stage in the counter 55 enables a path from the amplifier 63 through the matrix 70. There are, as indicated above, fifty such paths which are successively enabled under control of the operation of the counters 54 and 55.

As indicated above, the line busy indications are provided through the amplifier 35, the closed contact of the operated relay 45 and the amplifier 63 to the matrix 70. The potential supplied from the amplifier 63 is plus 24 volts and it occurs, as described above, at the same time that the section in the matrix 70, which is associated with the busy line, is enabled. For example, suppose that a busy signal is read for line 04. When a pulse is provided from the amplifier 63, the diodes 91 and 72*e* in the unit 80 are enabled to provide a path from the amplifier 63 to the control circuit 105. The amplifier 63 is multipled through ten coupling capacitors 94 in the matrix 70 to the group diodes or varistors 91 in the units 80—89. The path from the amplifier 63 to the circuit 105 is through the capacitor 94 in unit 80, the varistor 91 (forward biased by counter 55), the capacitor 75*e* and the varistor 72*e* (forward biased by counter 54). The diode matrix 70 in this manner functions as a steering circuit successively readying paths from the line busy amplifier 63 to the control circuits 101—50.

With the path to the circuit 105 readied, the pulse from the line busy amplifier 63 passes to the circuit 105. The amplitude of the line busy pulse is reduced from 24 volts to approximately 10 volts due to the drop across the diodes 91 and 72*e*, the 2-volt reverse bias on each of these diodes and the capacitive loading of the nine other similar units 81 through 89. A small delay in the arrival of the line busy pulse at the matrix 70 is provided by the amplifier 63 to allow sufficient time for switching transients to decay and also to free the system from dependency upon the quality of the tape transport mechanism, not shown, or the exactness of the alignment of the two tracks 31 and 32 with the reading heads 33 and 34. In other words, the effect of delaying the line busy pulse is to make the matrix operation independent of any irregularities in tape speed or misalignment of the magnetic tracks 31 and 32.

The fifty outputs from the matrix 70 are connected to the fifty capacitors 200 in the circuits 101—50. Each of the circuits 101—50 is identical. In the circuit 105, the 10-volt positive pulse is coupled through the capacitor 200 and a resistor 201 to trigger or fire a thyratron 204. The junction between the capacitor 200 and the resistor 201 is connected through a resistor 202 to a negative potential source 203. The source 203 normally maintains the thyratron 204 deionized or in its quiescent condition. The cathode of the thyratron 204 is connected to the negative source 205 and the anode of the thyratron 204 is connected to the winding of a register relay 207 which is shunted by a resistor 206. The winding of register relay 207 is connected to ground through its own normal contact. When the thyratron 204 is ionized, it operates the relay 207 which opens the operating path both for itself and for the thyratron 204 causing both to return to normal. The relay 207 controls a register 305 individual thereto which counts the operations thereof. The registers 301—50, which are shown diagrammatically in FIG. 2, are individually controlled by the relays 207 in the circuits 101—50, respectively.

The reading sequence continues in this manner with the fifty line identifying signals driving the matrix 70 to steer the line busy pulses, if any, to the circuits 101—50 and thereby to provide for the registration of the line busy information in the registers 301—50. As the traffic information following each of the coded group signals for group HG4 is read each of the registers may only be operated once.

After the fiftieth identifying signal is read by the head 34, relay 58 is operated to close the control path from the battery 59 to the amplifier 60 and from the battery 57 to the scan counter 61. The counter 61 steps to register the number of analyzed scans or groups of identifying signals. The amplifier 60 provides a reset pulse to the counters 54 and 55 making sure that they are set respectively at their first and last stages, and it also provides a reset pulse to the counter 12 and the circuit 44. When the circuit 44 resets, it releases relay 45 to disconnect the counter circuit 50 from the amplifier 36 and the amplifier 63 from the amplifier 35. When relay 45 releases, it also restores the connection from the amplifier 36 to the decoding circuit 9. The reader is in this manner returned to normal ready to decode the next group of signals on the tape 30. As the tape 30 is read, the information following the group signals for group HG4 is accumulated in this manner with the registers 301—50 keeping a running total of the number of line busy pulses read for each of the lines LO1–50 in group HG4.

As indicated above, relay 58 is released when the identifying pulses are received at the counter 50 to initiate a timing operation of an alarm circuit 180. When relay 58 releases, it completes a path from ground through a normal contact of relay 58, a resistor 189 and another normal contact of relay 58 to the base electrode of an NPN junction transistor 186. The potential at the base electrode is normally at minus 24 volts due to its connection through an operated contact of relay 58 and resistor 187 to the negative battery 188. The battery 188 normally reverse biases the base-emitter junction as the emitter electrode is connected through the varistor 185 and resistor 183, shunted by the capacitor 182 to the minus 24-volt source 181. The resistor 183 and a grounded resistor 184 connected thereto form a voltage divider so that the emitter potential is normally positive with respect to the base potential.

When relay 58 releases, the base potential becomes more positive at a rate determined by a 150-microfarad capacitor 191 connected between the resistor 189 and a minus 24-volt battery 192. As the capacitor 191 charges, the base potential slowly increases. The time constant of the capacitive circuit arrangement delaying the rise of base potential equals the reading time of approximately twenty-five scan or groups of signals. Between scans the relay 58 is operated to maintain the base potential at minus 24 volts and floats or isolates the capacitor 191. The capacitor 191 retains its charge between scans because its connection to ground and to the base electrode is opened at the contacts of relay 58. When the next scan is read relay 58 is again released to continue charging the capacitor 191 towards ground potential. When the capacitor 191 is charged sufficiently to forward bias the base-emitter junction the transistor 186 is operated to provide a pulse to the flip-flop 198. The flip-flop 198 operates the alarm relay 196 which locks to ground over a path from ground through resistor 199, the normal release switch 193, the operated contact of relay 196, the winding of relay 196 and resistor 194 to the negative battery 195. When relay 196 operates, it closes a discharge path through resistor 190 for the capacitor 191 causing the transistor 186 to return to normal and it stops the tape drive mechanism, not shown. When the alarm condition is thereafter checked, the switch 193 is operated to release the relay 196 and to reset the flip-flop 198. The reset path is grounded through the operated switch 193 which grounds the resistor 230 connected to the battery 231.

The alarm signal is provided to indicate that 25 consecutive scans or groups of signals have been read during which line busy pulses were absent. If a line busy pulse is received, it is provided to the amplifier 63, as described above, and also through a capacitor 64 and resistor 67 to the control grid of a thyratron 68. The thyratron is normally deionized due to the connection of its control grid through the resistor 67 and a resistor 65 to the negative battery 66. The cathode of the thyratron 68 is connected to the negative battery 69 which is more positive than the battery 66.

The line busy pulse from the amplifier 35 overcomes the inhibition of the battery 66 and triggers the thyratron 68. When the thyratron 68 is ionized it operates the line busy relay 170. The winding of the relay 170 is connected to the anode of the thyratron 68 and to ground through its normal contact. When relay 170 operates, it opens its operating path causing the thyratron 68 to deionize and it closes a discharge path for the capacitor 191 in the circuit 180. With the capacitor 191 discharged, the timing interval of the circuit 180 is reinitiated.

Each of the line busy pulses in the group HG4, in this manner, restores the alarm circuit 180 to normal. If line busy pulses are not provided to the thyratron 68 for twenty-five consecutive scans, the reading sequence is halted and the alarm relay 196 is operated.

The reading sequence continues, in this manner, as the traffic information for the group HG4 is analyzed and stored in the registers 301—50. Each of the line busy signals in each group HG4 is sorted and registered. When the entire tape is read, the transport mechanism is halted and a picture may be taken of the registers 301—50.

A continuous check is maintained of the accuracy of the counting operation in the data reader. As each of the groups HG4 is read exactly, fifty timing or identifying pulses should be counted by the counter circuit 50. If more or less than fifty pulses are counted some sort of error has occurred. Such errors may occur in the recording operation or due to dirt on the tape or a failure of one of the counter stages, etc. The terminals 9 and 0, respectively, of the counters 55 and 54 in the circuit 50 are connected to an error detector 158 which monitors the operation of the circuit 50. After a count of 50, the counters 55 and 54 should be set respectively to provide an output at their terminals 9 and 0.

If the reset pulse provided when relay 58 operates sets or turns on either the first stage of the counter 54 or the last stage of the counter 55, a pulse is provided to operate a thyratron 157 in the detector 158. A pulse from the terminal 0 of the counter 54 is coupled through the capacitor 171, the varistor 172, an operated contact of relay 58, the capacitor 151 and a resistor 154 to the control grid of the thyratron 157. The varistor 172 is normally reverse biased due to its connection to a minus 6-volt battery 163 through a resistor 162 on one side and to terminal 9 of the counter 55 through the resistor 173 on the other side. The varistor 172 is normally reverse biased to prevent operating the error detector 158 during the cyclic operation of the counter 54 until the counter 55 is at its last stage. When the counter 55 is set at its last stage, the varistor 172 is relatively forward biased to allow the passage of a pulse from the terminal 0 of the counter 54. Terminal 9 of the counter 55 is also coupled through the capacitor 174 and the varistor 177 to the contact of relay 58 in the detector 158. If a reset pulse from the amplifier 60 turns on either the first stage of the counter 54 or the last stage of the counter 55 a pulse is provided through the early make contact of the relay 58 to trigger the thyratron 157. The contact of relay 58 in the detector 158 is an early make contact to insure that a path is closed to the thyratron 157 before stages in the counters 54 and 55 can be affected by the reset pulse from the amplifier 60.

The cathode of the thyratron 157 is connected to the negative battery 156 and its anode is connected to the winding of the error relay 159 which is grounded through its own normal contact. When the thyratron 157 ionizes, relay 159 is operated. When relay 159 is operated, it opens its operating path restoring the thyratron 157 as well and it operates an error detector register 161.

Each time the reset pulse functions to set either the first stage of the counter 54 or the last stage of the counter 55, a count pulse is provided to the register 161. The error count represents an upper bound on the deviation of the readings of the registers 301—50 from the true traffic counts. In other words, it provides for a measure of the accuracy of the counting sequence in the data reader.

The error detector 158 provides a running check of the counting sequence as controlled by the signals on track 32 and the alarm circuit 180 provides a running check of the line busy pulse reception from the signals on track 31. Both the identifying and the traffic data are in this manner checked.

It is understood that the described embodiment of the invention described above is exemplary only. Other arrangements may be devised by those skilled in the art without departing from the scope and spirit of the invention. For example, the number of lines in the group that are analyzed and the number of groups may readily be changed. It is evident, therefore, that the above-described arrangement is merely illustrative of the principles of this invention.

What is claimed is:

1. A data processing system for the selective sampling of a plurality of groups of entries appearing on a magnetic tape during a multigroup traffic sampling interval comprising means for identifying each of said groups by a coded representation and identifying each of said entries, means for preselecting one of said groups, first means for receiving said coded representations of the identity of said groups and the identity of said units entries in said groups, a plurality of registers, second means for sampling said entries in each of said groups, decoding means connected to said first means for recognizing said coded representation of the identity of said preselected group, and means controlled by said decoding means for connecting and thereafter for disconnecting a signaling path between said second means and said registers.

2. A data processing system for determining the busy duration of lines in any one of a number of groups of lines wherein traffic data for each of the lines in each of the groups is presented in the form of coded group and line identifying signals and line busy signals comprising a first means for detecting said coded group and line identifying signals, second means for detecting said line busy signals, a plurality of registers equal in number to the maximum number of lines in any one of said groups, a preselector for selecting the identity of one of said groups, and means controlled by said preselector and responsive to said second means for supplying the line busy signals identifying the lines in said one of said groups to individual ones of said registers according to the line identifying signals.

3. In a data processing system for totalizing the number of times each of a plurality of units arranged in groups is found busy during a given time interval, means for receiving groups of scanning pulses where each group represents one of said groups of units and where each of the pulses represents an individual unit, means for receiving busy pulses concurrently with the application of some of said scanning pulses thereby indicating a busy condition of the unit represented by the concurrently received scanning pulses, a scan pulse counter means responsive to said group receiving means for selecting said scanning pulses in a preselected one of said groups, means responsive to the reception of each scanning pulse in said preselected group for advancing said counter, a diode matrix controlled by said counter and having a plurality of output positions, a plurality of registers each of which is connected to one of said output positions, respectively, means for applying each of said busy pulses concurrently received with said scanning pulses in said preselected group to said matrix, and means controlled by said matrix for selectively operating said registers.

4. In a data processing system in accordance with claim 3, said group selecting means including a preselector switch having a plurality of positions, each of said positions being individual to each of said groups, means normally connected to said group receiving means for identifying said groups, means jointly controlled by said identifying means and said switch for supplying only said scanning pulses in said preselected group to said counter, and means jointly controlled by said identifying means and said switch for supplying only said busy pulses concurrently received with said scanning pulses in said preselected group to said matrix.

5. In a data processing system in accordance with claim 4, means for monitoring said busy pulse receiving means and for providing an alarm indication responsive to the absence of busy pulses coincident with scanning pulses in a predetermined number of consecutive groups of scanning pulses, and means for monitoring the operation of said counter and providing an indication of the number of counter errors.

6. An automatic data reader for sorting and accumulating line traffic data in the form of coded signals recorded on a multitrack tape comprising a decoding unit for decoding signals recorded on one of the tracks of said tape, means for reading said tape, switching means normally connecting said reading means to said decoding unit, said decoding unit including a switch for preselecting one coded signal of a number of possible coded signals recorded on said tape, a counting circuit normally disconnected by said switching means from said reading means, means in said decoding unit effective when said preselected coded signals are provided by said reading means for operating said switching means to connect said counting circuit and to disconnect said decoding unit from said reading means, a matrix controlled by said counting circuit for sorting signals recorded on another of said tracks as provided by said reading means, means effective after a predetermined interval during which signals on said one track are not read for resetting said switching means, and means effective after a predetermined interval during which signals on said other track of said tape are not read for providing an alarm indication and for halting the operation of said reading means.

7. A data summarizer comprising means for reading data in the form of successively recorded signals on two tracks of a magnetic tape, counting means controlled by said reading means for counting the signals recorded in one of said tracks, gating means controlled by said counting means for steering pulses corresponding to the signals recorded on the other of said tracks, a plurality of registers individually controlled by said gating means for registering the pulses corresponding to signals recorded on said other track, means for recognizing a count by said counting means which deviates from a predetermined number, and means controlled by said recognizing means for registering an error indication.

8. An automatic data reader for analyzing coded data recorded in at least two reading channels comprising means for decoding the coded data recorded in one of said channels, first means for preselecting some of said decoded data on a coded basis, and rejecting the remainder of said data, second means for selecting some of said decoded data selected by said first means in accordance with the coding of the data in the second of said channels, and means controlled by said first and said second means for registering an indication of a simultaneous selection by said first and said second means.

9. A traffic reader for sampling traffic data presented on a recording medium as successive information indicating discontinuities arranged in a plurality of groups each identified by a coded representation comprising means for selecting one of said groups of discontinuities according to said coded representation, means controlled by said selecting means for detecting said succesisve discontinuities in said selected group on a time basis, and means responsive to said detecting means for registering said detected discontinuities whereby traffic data may be accumulated.

10. An automatic traffic reader for sampling line traffic data appearing on a storage medium as successive information indicating discontinuities arranged in a plurality of distinct groups, each of said groups being identified by a coded representation, comprising means for preselecting one of said groups to be sampled, means for scanning said coded representations, registering means, means jointly controlled by said preselecting means and said scanning means to enable said registering means, and means for successively directing said information indicating discontinuities contained in said preselected group on a time basis to said registering means.

11. An automatic data recorder for selectively sampling traffic data recorded on a first channel on a multichannel magnetic tape as a plurality of distinct groups of indicia, a second channel on said magnetic tape having recorded thereon coded representations identifying each of said groups and reference marks interjacent thereto, comprising means for preselecting one of said groups to be sampled, first means for successively scanning said groups of indicia, second means for scanning said second channel, means for registering said traffic data, means controlled jointly by said preselecting means and said second means for connecting said first means to said registering means upon the scanning of a particular one of said coded representations, means controlled by said second means for distributing said traffic data to said registering means according to said interjacent marks, and means effective to inhibit the operations of said first means upon said preselected group having been scanned by said first means.

12. An automatic data reader for analyzing data recorded as signals on first and second tracks of a magnetic tape, said signals in said first track representing a plurality of lines in a plurality of coded groups, said signals on said second track representing the condition of said lines at a particular time comprising first and second reading means for reading said signals on said first and second tracks respectively, means controlled by said first reading means for selecting signals representing a predetermined group of lines, counting means controlled by said first reading means for counting the number of lines in said predetermined group of lines, means controlled by said second reading means and said counting means for registering the condition of said lines in said predetermined group, and means effective when unselected signals are read by said first reading means for inhibiting the operation of said counting means.

13. An automatic data reader for sorting and accumulating line traffic data in the form of coded signals recorded on a multitrack tape comprising a decoding unit for decoding signals recorded on a first track of said tape, a first reading means for reading said first track, switching means normally connecting said first reading means to said decoding unit, said decoding unit including a switch for preselecting one coded signal of a number of possible coded signals on said first track, a second reading means for reading a second track of said tape, a counting circuit normally disconnected by said switching means from said first reading means, means in said decoding unit effective when said preselected coded signal is provided by said first reading means for operating said switching means to connect said counting circuit to said first reading means and to disconnect said decoding unit from said first reading means, and a matrix controlled by said counting circuit for sorting signals recorded on said second track provided thereto by said second reading means.

14. An automatic data reader as set forth in claim 13 including means effective after a predetermined interval during which said counting circuit is disconnected from said first reading means for resetting said switching means.

15. An automatic data analyzer wherein a magnetic tape has recorded thereon successive entries arranged in groups, each entry comprising a coded representation of all lines in said group entry and the busy condition of each of said lines at a particular time, said analyzer comprising first reading means for reading said coded representation of all lines in said group entries successively, second reading means controlled by said first reading means for recognizing the busy conditions on lines for only one of said groups of lines, means controlled by said first reading means for counting the number of entries in said recognized group, means controlled by said counting means for distributing the signals representing the busy conditions of said entries in said recognized group, and means for registering said distributed signals.

16. A data processing system to provide for the selective sampling of a plurality of groups of indicia comprising means for preselecting one of said groups, identifying means for identifying each of said groups by a coded representation, means responsive to said identifying means for distributing the indications in said preselected one of said groups, a plurality of registers responsive to said distributing means for registering said indications, and means controlled by said identifying means to inhibit said identifying means upon the completion of identifying said selected one of said groups.

References Cited in the file of this patent

UNITED STATES PATENTS 2,600,817 Victoreen _____________ July 17, 1952